March 23, 1943. R. J. GAUBERT Re. 22,292

BAG MAKING MACHINE AND METHOD

Original Filed April 26, 1935 7 Sheets-Sheet 1

INVENTOR.
Rene J. Gaubert

BY Paul D. Fehr
ATTORNEY.

March 23, 1943. R. J. GAUBERT Re. 22,292

BAG MAKING MACHINE AND METHOD

Original Filed April 26, 1935 7 Sheets-Sheet 2

INVENTOR.
Rene J. Gaubert

BY Paul D. Fisher

ATTORNEY.

March 23, 1943. R. J. GAUBERT Re. 22,292

BAG MAKING MACHINE AND METHOD

Original Filed April 26, 1935 7 Sheets-Sheet 3

INVENTOR.
Rene J. Gaubert

BY Paul D. F. Fehr
ATTORNEY

March 23, 1943. R. J. GAUBERT Re. 22,292
BAG MAKING MACHINE AND METHOD
Original Filed April 26, 1935 7 Sheets-Sheet 4
FIG. 9
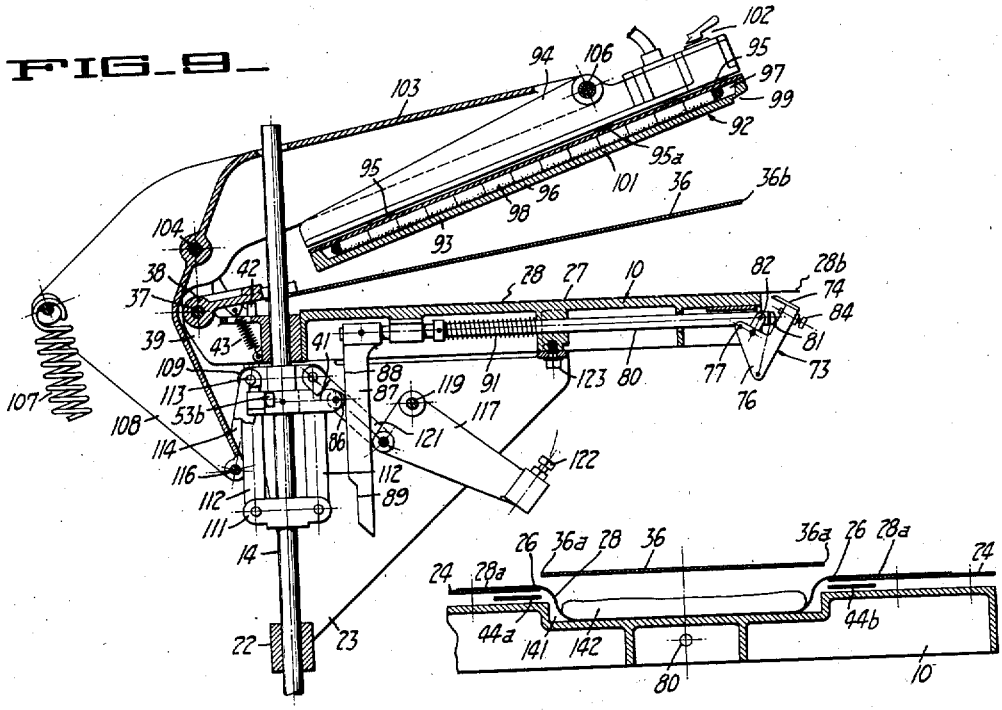
FIG. 11
FIG. 10
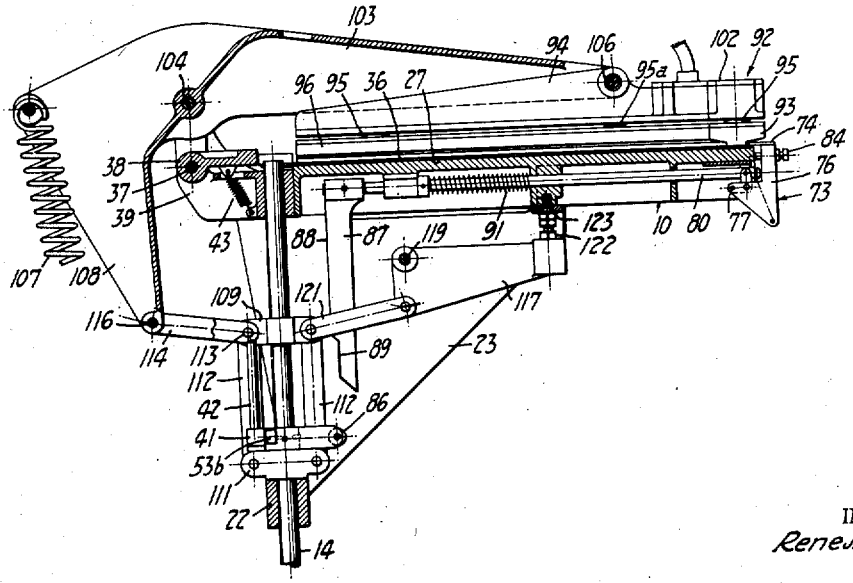
INVENTOR.
Rene J. Gaubert
BY Paul D. T. Fehr
ATTORNEY.

March 23, 1943. R. J. GAUBERT Re. 22,292

BAG MAKING MACHINE AND METHOD

Original Filed April 26, 1935 7 Sheets-Sheet 5

INVENTOR.
Rene J. Gaubert

BY Paul D. Fleh

ATTORNEY.

March 23, 1943. R. J. GAUBERT Re. 22,292

BAG MAKING MACHINE AND METHOD

Original Filed April 26, 1935 7 Sheets-Sheet 6

INVENTOR.
Rene J. Gaubert

BY Paul D. Fleh
ATTORNEY.

March 23, 1943. R. J. GAUBERT Re. 22,292

BAG MAKING MACHINE AND METHOD

Original Filed April 26, 1935 7 Sheets-Sheet 7

INVENTOR.
Rene J. Gaubert

BY Paul D. Fleher
ATTORNEY.

Reissued Mar. 23, 1943

Re. 22,292

UNITED STATES PATENT OFFICE 22,292

BAG MAKING MACHINE AND METHOD

Rene J. Gaubert, Oakland, Calif., assignor to Simplex Wrapping Machine Co., Oakland, Calif., a corporation of California Original No. 2,094,594, dated October 5, 1937, Serial No. 18,289, April 26, 1935. Application for reissue July 22, 1942, Serial No. 451,965

8 Claims. (Cl. 93—11)

This invention relates generally to machines and methods for forming bags from sheet material such as "Cellophane."

It is an object of the invention to provide a machine and method of the above character which will dispense with the conventional practice of gluing together the overlapping edges of sheet material after the sheet is folded to form the bag. In this connection the present invention employs moisture-proof "Cellophane," which makes possible a seal between overlapping portions by the application of heat and pressure.

Another object of the invention is to provide a machine of the above character which will not be unduly expensive with respect to first cost and maintenance, and which can therefore be used by department stores, mail order houses, bakeries and the like, to form simple types of bags directly from "Cellophane" stock. Up to the present time it has been customary for such establishments to purchase "Cellophane" bags made by bag manufacturers, at a relatively high cost. My machine, because of its low cost and ease of operation, will make possible the manufacture of bags as they are required by such establishments, at a considerable saving.

Further objects of the invention can be briefly outlined as follows: To afford relatively high capacity with minimum requirements with respect to floor space and skill of the operator; to afford mechanical movements which will perform the necessary folding and sealing operations without undue mechanical complications and with a minimum amount of power consumption; and to enable sealing over all of the required areas in a single operation, in cyclic sequence with preceding folding operations.

Further objects of the invention will appear from the following description in which the preferred embodiment of the invention has been set forth in detail in conjunction with the accompanying drawings.

Referring to the drawings:

Fig. 9 is a cross-sectional detail taken along the line 9—9 of Fig. 3.

Fig. 10 is a detail similar to Fig. 9 but showing the heater in a different operating position.

Fig. 11 is a cross-sectional detail, illustrating a modification in which an article is being wrapped simultaneously with the formation of a bag.

Figures 1, 2:
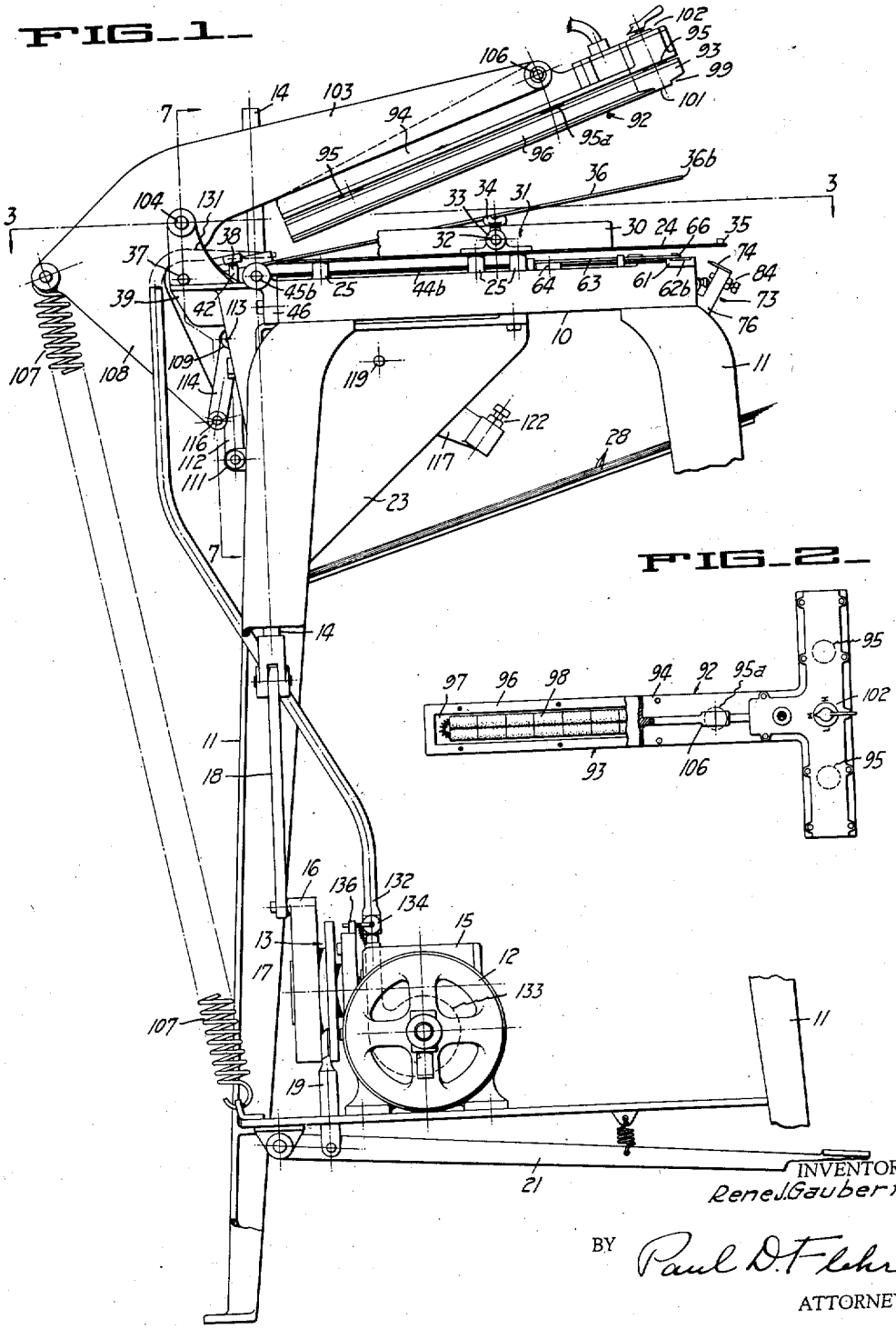
Fig. 1 is a side elevational view showing the machine incorporating the present invention.
Fig. 2 is a plan view, showing the heater incorporated in the machine of Fig. 1.

The machine as illustrated in the drawings consists of a frame forming a working table, there being a table top 10 with supporting legs 11. A suitable source of electric power is provided, such as an electric motor 12. By means of a cyclic drive mechanism, designated generally at 13, the electric motor 12 serves to cyclically reciprocate a vertical shaft 14. Particularly from the standpoint of simplicity of construction, it should be noted that all of the working parts of the machine to be subsequently described are arranged to be operated by reciprocation of this shaft, although it is evident that in some instances a more elaborate form of mechanism for interconnecting the working parts with the electric motor may be desirable.

The cyclic drive means 13 has been shown including a gear box 15, to secure a suitable reduction in speed. The gear box drives a crank disc 16, through a suitable one-revolution clutch 17. A crank rod 18 serves to connect the lower end of shaft 14 with the crank disc 16. The trip 19 for the one-revolution clutch 17 is shown connected to a foot lever 21, whereby when this lever is depressed manually, clutch 17 is engaged to drive crank disc 16 one revolution, after which the clutch is automatically tripped. A suitable guide journal 22 for the shaft 14 is shown being carried by a depending bracket 23, which in turn is secured to the frame of the machine.

Figure 3:
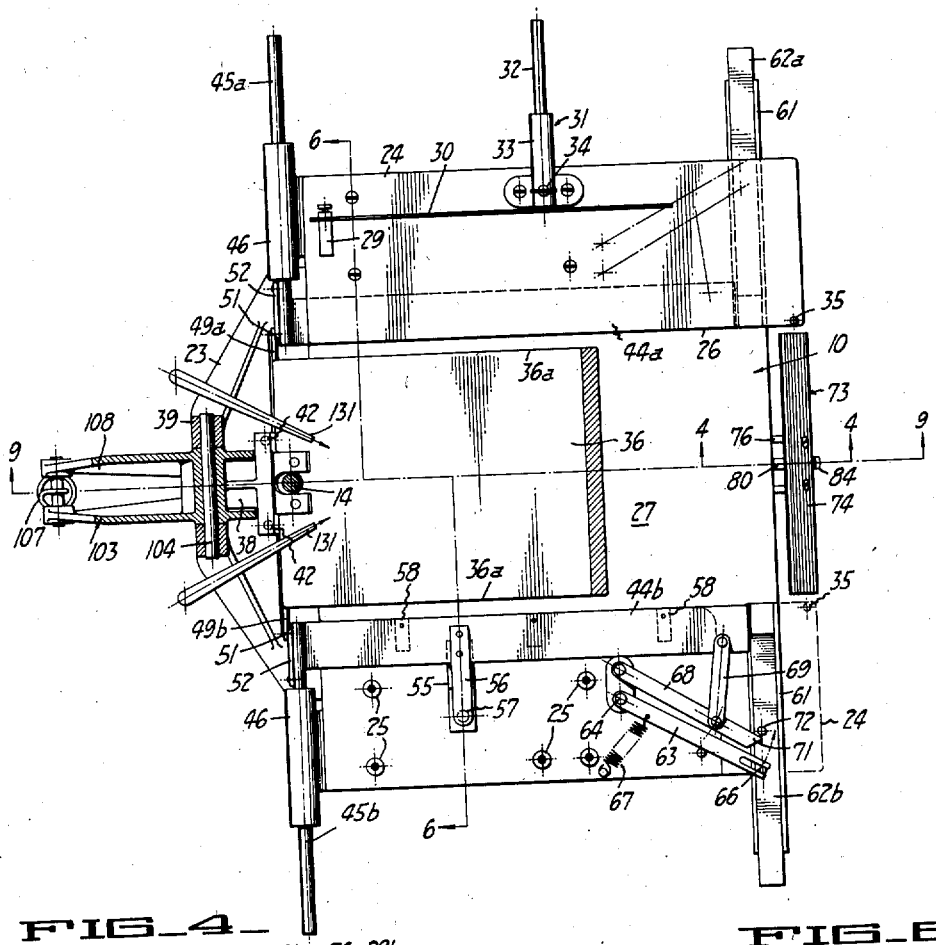
Fig. 3 is a cross-sectional view taken along the line 3—3 of Fig. 1.
Figure 6:
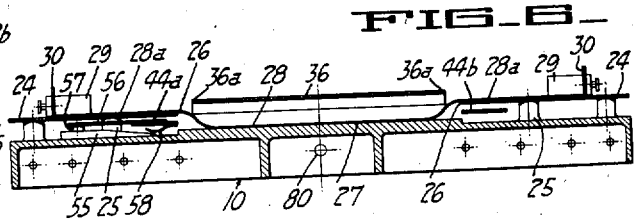
Fig. 6 is a cross-sectional detail taken along the line 6—6 of Fig. 3.
Figure 5:
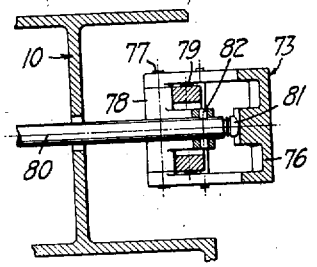
Fig. 5 is a cross-sectional detail taken along the line 5—5 of Fig. 4.

A suitable detail for the table top can be best understood by reference to Figs. 3 and 6. A pair of cover plates 24 are provided, which are secured to the upper surface of the table 10 by the spacing studs 25. These plates extend from the rear to the forward end of the machine, over the side areas of the working table, and, assuming that a simple type of rectangular bag is to be made, the inner longitudinal edges 26 are parallel. The upper surface of the working table, extending between the longitudinal edges 26, forms a flat operating surface 27, with which a sheet 28 of "Cellophane" or like material of which the bag is to be made, can engage.

In order that a sheet of material can be readily centralized upon the work table by an operator, suitable gauging or centralizing devices 31 are provided. These devices may be duplicates and can be conveniently mounted upon the cover plates 24. The one device 31 illustrated in Fig. 3 consists of the bar 30, extending parallel to the longitudinal edge 26 of the corresponding cover plate 24, and carried by one end of a rod 32. This rod is slidably carried by a bracket 33, which in turn is mounted upon the plate 24. By means of a set screw 34, the distance between bar 30 and the longitudinal center line of the working table, can be adjusted. Gauge pins 35 (Figs. 1 and 3) are also provided near the forward edges of plates 24, to facilitate properly locating the forward edge of the sheet. Gauge blocks 29 are also carried by bars 30, to engage the rear edge of the "Cellophane" sheet, and these blocks are adjustable forwardly and rearwardly of the machine.

One of the elements utilized during the folding and sealing of sheet 28 is a plate-like mandrel 36. In accordance with the previous assumption that simple, rectangular-shaped bags are to be made, this mandrel is rectangular in contour, and for the larger sizes of bags, it has a width slightly less than the distance between the edges 26 of the cover plates 24, and with the plates disposed substantially in alignment with the longitudinal center line of the working table, when viewed in plan as in Fig. 3. The rear end of plate 36 is detachably secured to a shaft 37 which in turn has a pivotal connection 38 with a fixed bracket 39 forming part of bracket 23. Since the axis of the pivotal connection 38 is horizontal, the mandrel has pivotal movement in a vertical plane, towards or away from the table surface 27. It may be explained at this point that when mandrel 36 is in its lowermost position, it directly engages the upper side of the "Cellophane" sheet 28, with this sheet being located between the mandrel and the surface 27. Assuming that the sheet 28 has been properly centralized, its equal side margins 28a can be folded over the side longitudinal edges 36a of the mandrel 36. Likewise, a forward end margin 28b is provided, which can be folded over the forward edge 36b of the mandrel.

While raising and lowering of the mandrel 36 might in some instances be carried out manually, automatic operation of the mandrel is preferred. For this purpose a clamp 41, in the form of a cross-head, is shown secured to the vertical shaft 14. A pair of pins 42 extend upwardly through bracket 23 and have their lower ends secured to the clamp 41. The upper ends of these pins are adapted to engage the under side of casting 38, whereby when shaft 14 is in the upper limit of its travel, mandrel 36 is elevated to substantially the position shown in Fig. 9. When shaft 14 moves downwardly, it is apparent that lowering of pins 42 permits mandrel 36 to drop down upon the table surface 27 under the urge of gravity and tension spring 43.

Figure 7:
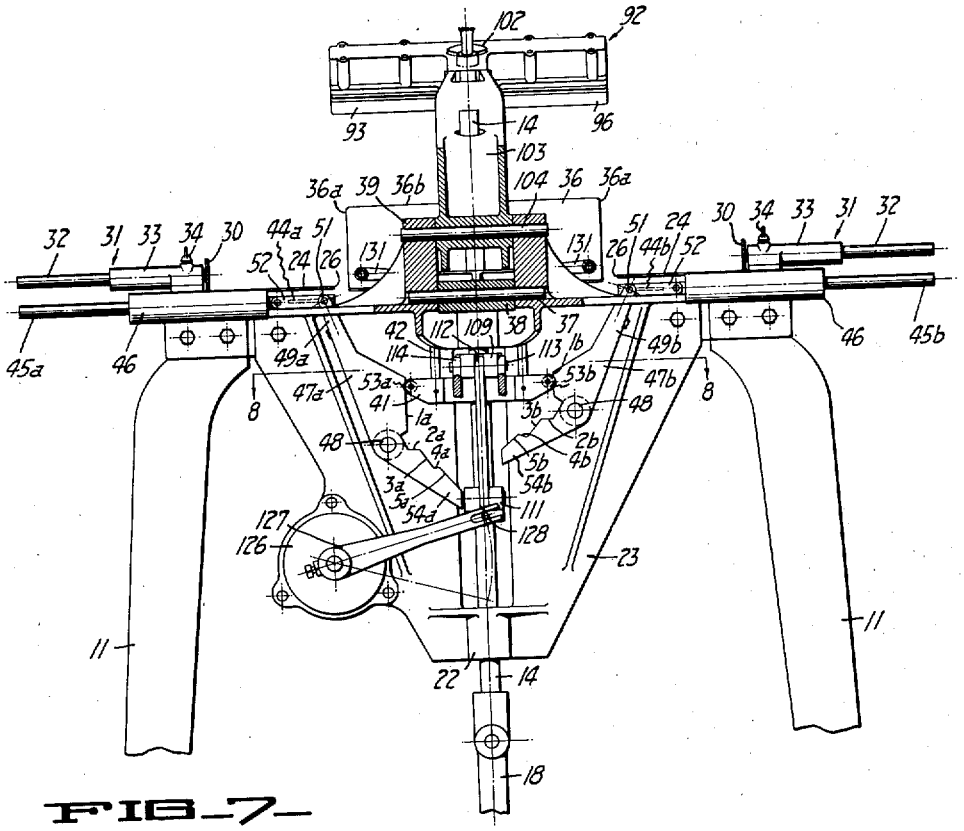
Fig. 7 is a cross-sectional view taken along the line 7—7 of Fig. 1.
Figure 8:
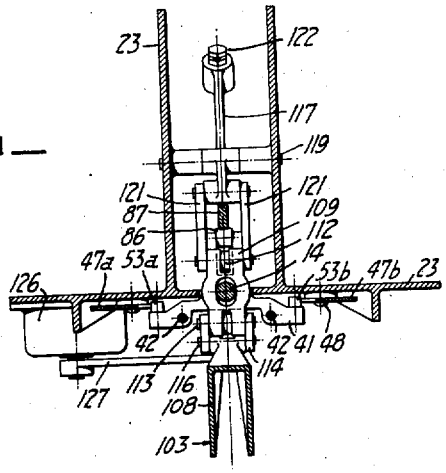
Fig. 8 is a cross-sectional detail taken along the line 8—8 of Fig. 7.
Figure 12:
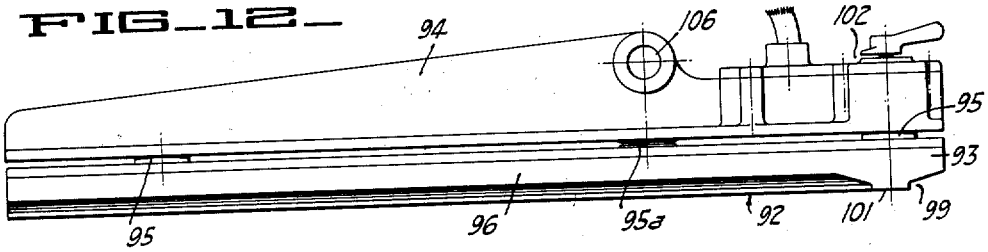
Fig. 12 is a side elevational detail of the heater structure.
Figure 13:
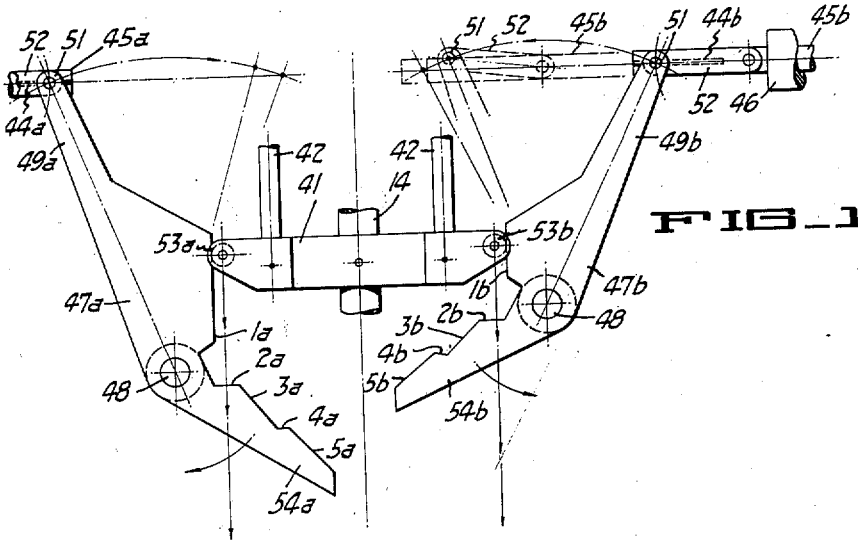
Fig. 13 is a side elevational detail showing cam means for operating the side folding members.
Figure 14:
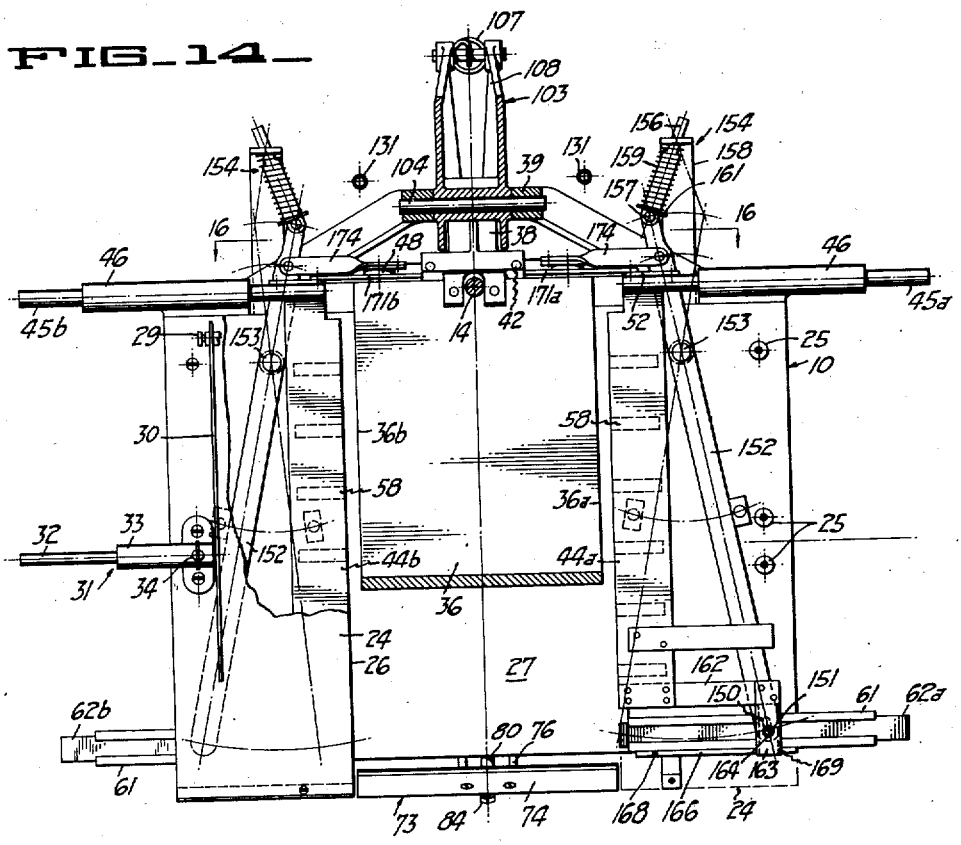
Fig. 14 is a plan view, partly in cross section, showing a preferred modification of the machine.

The means illustrated for effecting a folding-over of the side margins 28a includes the following elements: Underlying the cover plates 24 are the folding members 44a and 44b. These members are in the form of elongated strips of flat metal bars. In order to guide these bars for parallel movement in opposite direction, the rear end of each member is secured to rods 45a and 45b, which in turn are slidably carried by the brackets 46. As representative of suitable means for properly actuating folding members 44a and 44b, a pair of levers 47a and 47b are provided, which are carried by pivot pins 48 upon the bracket 23. The upwardly extending arms 49a and 49b of these levers have pivotal connections 51 to links 52 which are connected to the inner ends of rods 45a and 45b. The clamp or cross-head 41 on shaft 14 carries a pair of rollers 53a and 53b, which cooperate with suitable cam surfaces on the levers 47a and 47b. The different portions of the cam surfaces on lever 47a have been designated by numerals 1a, 2a, 3a, 4a and 5a, and the corresponding portions on lever 47b have been designated by numerals 1b, 2b, 3b, 4b and 5b. With the exception of portions 1a and 1b, all of the cam portions are formed on the lower depending arms 54a and 54b of the cam levers. The manner in which these cam levers operate will be presently described in greater detail. For the present, it may be noted that when the shaft 14 is in the uppermost limit of its travel, the cam portions 1a and 1b are engaged, and the folding members 44a and 44b are in their retracted positions, as illustrated in Figs. 6 and 7. However, when shaft 14, together with cross-head 41, is moved downwardly, the cam portions on the arms 54a and 54b are engaged, thus causing the cam levers to rotate in opposite directions, to move the folding members 44a and 44b inwardly in opposite directions over the mandrel 36.

For at least the initial part of the inward movement of folding members 44a and 44b, it is desirable to have them elevated with respect to the upper surface of mandrel 36. For this purpose an arm 56 is secured to an intermediate part of each folding member (Figs. 3 and 6). The outer end of each arm 56 carries a button or pad 57, adapted to slidably engage the upper surface of a bar or strap 55. The under side of each folding member carries a plurality of spaced leaf springs 58. These springs gently engage the upper surface of the mandrel, to facilitate formation of a distinct fold to somewhat tighten the sheet upon the mandrel, and to hold the folded margins during the sealing operation.

It has been previously explained that when the machine is being operated, a sheet of "Cellophane" is arranged below the mandrel 36 and is located to afford not only the substantially equal side margins 28a but also the forward end margin 28b. To assist in properly folding this end margin of the sheet over the end edge 36a of the mandrel, means are provided as follows: Transverse channel guides 61 are mounted adjacent the forward end of the table 10, beneath the cover plates 24. Fold-line retaining members 62a and 62b, in the form of thin metal strips or blades, are slidably disposed in these guides.

Instead of supplying separate mechanism, taking its motion directly from shaft 14, members 62a and 62b can be automatically operated by simple mechanism interconnecting them with the folding members 44a and 44b. Thus as shown in Fig. 3, a lever 63 has a pivotal mounting 64 to the table 10, and is disposed beneath the corresponding cover plate 24. The free ends of levers 63 have pin and slot connections 66 with the corresponding folding members. A tension spring 67 is provided, tending to swing each arm 63 outwardly, thus tending to bias the corresponding fold-line retaining member (62a or 62b) towards retracted position. In addition to the lever 63, a trip lever 68 is provided, which likewise has its one end pivotally mounted to the table 10. This lever is connected to the corresponding side folding member (44a or 44b), by means of link 69. The free end of lever 68 is adapted to engage a pin 72, carried by the corresponding end retaining member (62a or 62b). The action is such that when the side folding members are moved inwardly, engagement of levers 68 with pins 72 likewise causes the end retaining members 62a and 62b to move inwardly over the forward edge of the mandrel 36. However, before the side folding members 44a and 44b have reached the limit of their inward movement, pins 72 escape by the ends 71 of the trip lever, thus permitting the end folding members 62a and 62b to be snapped back to their retracted positions, as illustrated in Fig. 3, under the pull of springs 67. It will be noted in Fig. 3 that the inner ends of the members 62a and 62b terminate short of the inner edges of the side folding members 44a and 44b when all of the folding members are in their retracted positions.

To carry out a folding operation to form the bottom of the bag, a folding and gripping device 73 (Figs. 4, 5, 9 and 10) is provided. In the form illustrated, this device consists of a bar 74, carried by an L-shaped member 76. In order to secure the type of motion desired for the clamping bar 74, member 76 has a pivotal connection 77 with one arm of an L-lever 78. This L-lever in turn is carried by a fulcrum pin 79, which is fixed with respect to the table 10. Slidably mounted beneath the table 10 there is a rod 80, the forward end 81 of which is adapted to engage that portion of the member 76 to which the bar 74 is attached. Likewise, the forward end of rod 80 has a pivotal connection 82 to the other arm of the L-lever 78. The member 76 is normally biased in a counter-clockwise direction (as viewed in Fig. 4) about the pivot connection 77, by the tension spring 83. It will be noted that one end of this tension spring is shown anchored to member 76, at a point forwardly of both the pivotal connection 77 and the pivot pin 79, while the other end of this spring is anchored to the forward end 81 of rod 80.

Figure 4:
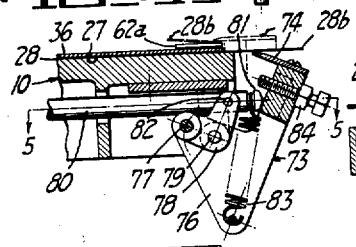
Fig. 4 is a cross-sectional detail taken along the line 4—4 of Fig. 3.

With the arrangement described above, as rod 80 is moved to the left, as viewed in Fig. 4, member 76 under the urge of spring 83 is caused to swing in a generally counter-clockwise direction, to elevate bar 74 and to translate the same to a position overlying the forward edges of retaining members 62a and 62b and the forward edge 36b of the mandrel 36 (assuming that mandrel is in its lowered position). When in such position, further movement of bar 74 towards the rear of the machine is arrested by the stop pin 84. Continued movement of rod 80 towards the rear of the machine causes a lowering of the pivotal connection 77, and such lowering movement (which occurs after retraction of members 62a and 62b) is accompanied by a general lowering of the entire member 76, so that bar 74 is dropped into yieldable gripping engagement with the folded margin 28b of the sheet of "Cellophane." Conversely, return movement of rod 80 towards the forward end of the machine first causes bar 74 to swing back substantially to the position shown in solid lines in Fig. 4. In the folding operation just described, it is evident that members 62a and 62b properly hold down the adjacent portion of the "Cellophane" sheet, to avoid undesirable creases and to facilitate formation of properly folded corners and a distinct bottom fold line.

The means for effecting reciprocation of rod 80 can be best understood by reference to Figs. 9 and 10. Thus, the representative means illustrated includes a roller 86, carried on the forward side of cross-head 41. Secured to the rear end of rod 80 there is a cam finger 78, the surfaces 88 and 89 of which are adapted to engage the roller 86. A compression spring 91, surrounding rod 80, normally urges this rod, together with finger 87, towards the roller 86. It will be noted that cam surfaces 88 and 89 are parallel with respect to the travel of shaft 14, and that surface 89 is offset forwardly with respect to surface 88. Therefore, while shaft 14 is in the upper portion of its travel, with the roller 86 in engagement with surface 88, the device 73 is retained in its released position, as shown in Fig. 9. As the cross-head 41 moves downwardly it passes beyond the lower end of surface 88, and thereupon finger 87 and rod 80 move rearwardly a limited amount, until the roller 86 is in engagement with surface 89. Such movement is sufficient to bring bar 74 into an elevated position above the forward edge 36b of the mandrel 36. As the cross-head 41 moves downwardly a further amount, it finally passes below the lower end of finger 87, with the result that further rearward movement of rod 80 serves to bring bar 74 into clamping engagement with the blades 62a and 62b.

For the sealing operation following folding of the side and end margins of the sheet of "Cellophane" over the mandrel 36, a heater structure 92 is employed. While the details of this structure may vary in practice, it has been shown including a heater 93, secured to a comparatively rigid backing 94. The heater itself is generally T-shaped in plan profile, as shown in Fig. 2, and its body 96 can be formed of suitable metal. The body is hollow to afford an inner recess 97, which accommodates a suitable electrical heating element 98. The lower face of the body 96 has its edges cut away, as indicated at 99, to afford a limited T-shaped pressing area 101. This lower face may be roughened or embossed to promote better sealing action between the overlapping portions of the "Cellophane" sheet. The upper surface of the mandrel 36 can likewise be embossed for the same purpose.

It is desirable to employ suitable means for automatically controlling the temperature of the heater, as for example a thermostatic switch indicated generally at 102. Attachment of the heater to the backing 94 can be by means of three sets of pads 95, which are located to apply pressure near the extremities of the T. A further set of pads 95a located near the center of the T, are normally spaced apart a slight amount, but are brought into contact when sufficient force is applied to the backing to slightly spring the same within its elastic limit. A mounting of this character has been found desirable in securing even distribution of pressure over the T-shaped sealing area, irrespective of inaccuracies in manufacture or slight warpage of the heated parts.

For supporting the heater structure 92, a forwardly extending arm 103 is provided, which is pivotally attached to the bracket 39 by shaft 104. The forward end of arm 103 has a pivotal connection 106 with the heater backing 94. A tension spring 107 serves as an effective counterbalance.

In order to swing the heater structure 94 downwardly and upwardly with respect to the table 10 in properly timed sequence with other functions, actuating means operatively connected to shaft 14 is provided as follows: The rear part of arm 103 carries a depending arm 108 (Figs. 9 and 10). Slidably carried by the shaft 14, on opposite sides of the cross-head 41, are the collars 109 and 111. These collars are connected together at a spaced distance apart, by the bars 112. The upper collar 109 has a pivotal connection 113 with a pair of links 114, which in turn have a pivotal connection 116 with the lower end of arm 108. Upon the forward side of collar 109 there is a lever 117, having a fixed fulcrum 119 to bracket 23, and connected to the collar 109 by links 121. The forward end of lever 117 is provided with an adjustable pin 122 adapted to engage a bolt or like stopping surface 123 on the underside of the table 10. Thus, rotation of lever 117 in a counter-clockwise direction, as viewed in Fig. 10, is definitely limited, although the precise limit at which the lever is stopped can be adjusted.

With the arrangement described for connecting arm 103 to the shaft 14, when the shaft 14 is in the position shown in Fig. 9, cross-head 41 is adjacent the upper collar 109, both of the links 114 and 121 are swung upwardly, and lever 117 is swung downwardly. As shaft 14 moves downwardly, collars 109 and 111 remain stationary until the cross-head 41 contacts with the upper surface of collar 111. Thereafter, further downward movement of shaft 14 causes collars 109 and 111 to be likewise carried downwardly, with the result that arm 108 and the forwardly extending arm 103 are rotated in a clockwise direction, to lower the heater structure 92. During the final movement of shaft 14 to the lowermost limit of its travel, links 114 and 121 pass through dead center positions, substantially as shown in Fig. 10, thus locking the heater structure 92 against the lowered mandrel 36. For the first part of the upward return travel of shaft 14, collars 109 and 111 remain stationary until cross-head 41 has come into contact with the lower face of collar 109. Such lost motion affords sufficient time for completion of the sealing operation. Thereafter, both of the collars are moved upwardly, to break the toggle established by links 114 and 121, and thereafter these collars move upwardly under the urge of tension spring 107, to swing arm 103 in a counter-clockwise direction and thus again elevate the heater structure 92. To obviate upward movement of the heater structure 92 at too rapid a rate, a suitable frictioning device is provided, such as a shock absorber 126 of the type employed for automotive purposes. The body of this shock absorber is mounted upon bracket 23, while the operating rod 127 has a pin and slot connection 128 with the lower collar 111.

In the preceding description it has been pointed out that when the machine is operating, a sheet of material such as "Cellophane" is placed upon the table, and, following lowering of mandrel 36, the side and forward margins of the paper are folded over the side and end edges of the mandrel. It may be further pointed out at this time that following such operation, and following folding and gripping of the forward folded margin by the device 73, the heater structure 92 is lowered to bring the T-shaped area 101 into tight engagement with the overlapping edges of the side margins and also with the folded bottom of the bag. Following such a sealing operation, the device 73 is released, the heater structure starts to elevate, and the side folding members 44a and 44b are retracted. The mandrel 36, which now carries the finished bag formed about it, is then raised to the elevated position shown in Fig. 9.

In some instances the bag may cling to the mandrel, making it difficult for the operator to effect rapid removal. Therefore, to obviate this difficulty and for other reasons, I prefer to employ an air jet directed toward the open end of the bag and upon the upper side of the mandrel. A suitable means for this purpose is illustrated in Fig. 1, taken in conjunction with Fig. 3. Thus, mounted adjacent the rear end of the mandrel 36 are the air discharge nozzles 131. These nozzles 131 connect to a common air supply pipe 132, which in turn leads to a suitable supply of air under pressure. For example, I have indicated an air pump or blower 133, driven by the electric motor 12 and connected to pipe 132 through the control valve 134. Valve 134 can be arranged to be tripped open by cam 136, carried upon the one-revolution clutch 17. Thus, at the completion of each revolution of the crank disc 16, valve 134 is momentarily tripped to open position, to permit a blast of air to be discharged through nozzles 131. Since the blast of air is directed towards the open end of the formed bag and upon the upper side of the mandrel 36, it serves to loosen the bag with respect to the mandrel and thus facilitate removal of the bag. It also serves to cool the mandrel and to rapidly cool and set the seal.

Operation of the machine can now be reviewed in entirety, as follows: Assuming that the motor 12 is in operation, the operator places upon the table a sheet of the material from which the bag is to be formed, substantially as shown in Fig. 6, utilizing the guides 29 and 30 and the guide pins 35 to effect proper centralization. When finally positioned, the forward edge of the paper extends somewhat beyond the forward edge 36b of the mandrel 36, to afford sufficient material to form a forward margin 28b for folding in forming the bottom of the bag. The sheet of material employed is preferably a moisture-proof "Cellophane," carrying a coating such as will afford a seal when overlapping portions of the "Cellophane" are heated and pressed together. After proper positioning of the sheet of "Cellophane," the operator depresses foot lever 21 to trip the clutch 17 and thus start shaft 14 downwardly in the first part of its cyclic reciprocation. Initial downward movement of shaft 14 causes a lowering of pins 42, with a consequent dropping of mandrel 36 upon the sheet. Further downward movement of shaft 14 brings roller 53b (Fig. 7) into engagement with the cam surface portion 2b of lever 47b, to cause this lever to swing in a counter-clockwise direction, as viewed in Fig. 7, and to cause folding member 44b to slide inwardly over the mandrel 36. Such movement serves to fold the side margin 28a of the sheet of material over the corresponding side edge 36a of the mandrel. Such inward movement of the folding member 44b likewise causes inward movement of the end fold-line retaining member 62b. For a short interval, while roller 52b is engaging cam surface 3b, both members 44b and 62b remain stationary. During this interval, folding member 44a is advanced over the mandrel 36 by virtue of the engagement of roller 53a with cam portion 2a of lever 47a, and the end retaining member 62a likewise moves inwardly. Because of the leverage afforded by levers 68, the two end members 62a and 62b have their inner ends in relatively close proximity as compared with the inner edges of members 44a and 44b, and while in such position they remain substantially stationary for a short interval, while rollers 53a and 53b are advancing over cam surfaces 3a and 3b (which are now substantially vertical). During this interval, roller 86 passes below the lower extremity of cam surface 88, whereby movement of rod 80 causes bar 74 to be elevated and transposed to substantially the position shown in dotted lines in Fig. 4. Because of this operation the projecting end 28b is folded over the end members 62a and 62b, the forward edges of these members defining the fold line for the bottom of the bag and also serving to retain the folded side margins flat upon the mandrel, thereby insuring properly folded corners and the absence of wrinkles.

Further and continued downward movement of the cross-head 41 causes the side folding members 44b and 44a to be successively moved to their final limits, by virtue of engagement of rollers 53a and 53b with cam shoulders 4a and 4b. Such final inward movement is accompanied by escapement of trip lever 68 over pins 72, with a springing-back of the end members 62b and 62a. Immediately preceding this operation, roller 86 passes below the extremity of cam surface 89, to cause bar 74 to be lowered in gripping engagement with the folded end margin 28b and with the members 62a and 62b. Retraction of members 62a and 62b permits the bar 74 to press the folded end margin directly against the mandrel.

Immediately prior to gripping movement of bar 74, cross-head 41 causes collars 109 and 111 to be lowered, to swing down the heater 92. When cross-head 41 has reached its lowermost limit, as illustrated in Fig. 10, the toggle established by links 114 and 121 is set, and the lower surface 101 of the heater is forced with considerable pressure against the T-shaped area formed by the overlapping edges of the side margin and also the overlap between the end margin 28b and the side margins. A relatively short duration of time for such engagement of heater surface 101 with the overlapping portions of the "Cellophane" will suffice for a sealing operation.

As shaft 14 now starts its upward movement, it first engages cam finger 87, to release the bar 74, and then engagement with collar 109 causes breakage of the toggle established by links 114 and 121, to permit elevation of the heater 92 under the urge of tension spring 107. Continued upward movement of shaft 14 causes levers 47a and 47b to be swung back to the positions illustrated in Fig. 7, by virtue of engagement of roller 53a with cam surface 12, and roller 53b with cam surface 1b, to retract the side rolling members 44a and 44b. Final movement of shaft 14 causes pins 42 to elevate the mandrel 36, which now has the bag formed about it, and upon elevation of the mandrel a jet of air is discharged from nozzles 131 to tend to release the bag with respect to the mandrel.

In the foregoing description I have referred principally to the making of a simple bag from "Cellophane," having a substantially rectangular contour when flattened. It is possible, however, to form the bag about an article, thus dispensing with the operation of placing articles in the bags after they are formed. Thus, as shown in Fig. 11, the top of the table can be provided with a pocket or recess 141, sufficient in dimension to accommodate the article 142. Provided the recess 141 is not too deep to cause undue wrinkling of the "Cellophane" sheet, the machine will now operate the same as has been previously described, with the exception, however, that the bag will be formed directly about the article. It is apparent that such a modified machine can be employed in many instances, as for example in wrapping laundered articles, or for like application where the article is not too bulky.

The machine can be easily adapted to form bags of varying sizes. If a shorter bag is desired, without change in width, shorter sheets are employed, and the gauge blocks 29 are adjusted accordingly. If the width of the bags is to be varied, a narrower mandrel is substituted for the mandrel 36, narrower sheets are employed, and the gauge bars 30 are readjusted.

In some instances where a stiffer bag is desired, or where a less expensive grade of "Cellophane" is employed, a liner of paper can be used in addition to the "Cellophane" sheet. In such instances the paper liner, somewhat greater in width than the width of the mandrel 36, is superposed over the "Cellophane," in introducing the same into the machine. Thus in the formation of the bag, the side margins of the liner are folded, and when the bag is completed, the liner affords considerable stiffness and strength. The edges of this liner can be interposed in the seal between the folded side and end margins of the "Cellophane," thus in effect forming a single unit consisting of a "Cellophane" bag joined to an inner paper bag.

The modification illustrated in Figs. 14 to 17, inclusive, is deemed superior, particularly with respect to the mechanisms afforded for operation of the side folding members 44a and 44b, and for operating the fold-line retaining members 62a and 62b. Thus, referring particularly to the parts serving to correlate movements of members 44a and 62a, members 62a carries a pin 151 (Fig. 15), which extends through a slot 150 formed in one end of a lever 152. This lever is fulcrumed to the table 10 by pivot 153, and its rear end is connected to a toggle-spring assembly 154. This assembly consists of a plunger 156, having a pivotal connection 157 to the rear end of lever 152, and slidably carried by a fixed bracket 158. A compression spring 159 has its one end bearing upon bracket 153, and its other end bearing upon a washer 161 formed as a collar on plunger 156. Thus spring 159 serves to urge the lever 152 in either one of two directions, past an intermediate dead center position.

Near the forward end of folding member 44a there is an L-shaped extension arm 162, the forward end portion 163 of which is provided with an aperture 164. In the position of the parts illustrated in Figs. 14 and 15, the upper projecting end 165 of pivot pin 151 extends into aperture 164, and therefore inward movement of the folding member 44a causes the corresponding member 62a to move inwardly in unison with the same. Mounted on the forward edge of the table 10 there is a plate 166, the upper edge of which underlies the path of movement of the forward end portion 163 of arm 162. Near the inner end of plate 166 its upper edge is provided with a cam portion 168 which, when engaged by the arm portion 163, causes this arm portion to be lifted free of the pin 151. Note in this connection that the edges of arm portion 163 are bevelled, as indicated at 169, so that one of these bevelled edges engages and rides over a correspondingly bevelled shoulder afforded by cam portion 168. Likewise note that arm 162 affords some resilience, so that while portion 163 can be sprung upwardly, it is normally urged towards member 62a. Connecting parts similar to those described above for members 44a and 62a are likewise provided for members 44b and 62b, and therefore such parts have been designated by like numerals in the drawings.

The cam levers for effecting operation of the folding members 44a and 44b have likewise been modified, and additional cam elements have been associated with the same for effecting actuation of levers 152 to retract members 62a and 62b, while the folding members 44a and 44b remain in their projected positions. Thus, referring to Fig. 16, simplified cam levers 171a and 171b are provided, which have surfaces 1a and 1b similar to the levers 47a and 47b of Fig. 7, but which have their lower arms 172a and 172b provided with simple linear surfaces 6a and 6b. The upper ends of these levers 171a and 171b are connected to the side folding members 44a and 44b in a manner similar to the connections previously described with respect to Fig. 7, for the levers 47a and 47b in the first described modification. The pivot pins 48 likewise pivotally support cam levers 173a and 173b, which have their upper ends connected by links 174 to the rear end portions of levers 152. The lower portions 176a and 176b of levers 173a and 173b extend toward each other, and, for certain operating positions, are in the paths of movement of rollers 53a and 53b.

Figure 15:
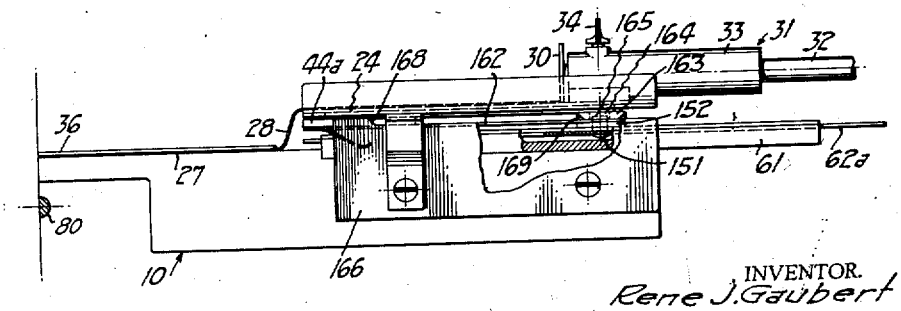
Fig. 15 is an end detail view of one-half of the table and associated parts, showing particularly the elements serving to interconnect side folding members, with end fold line retaining members.
Figure 16:
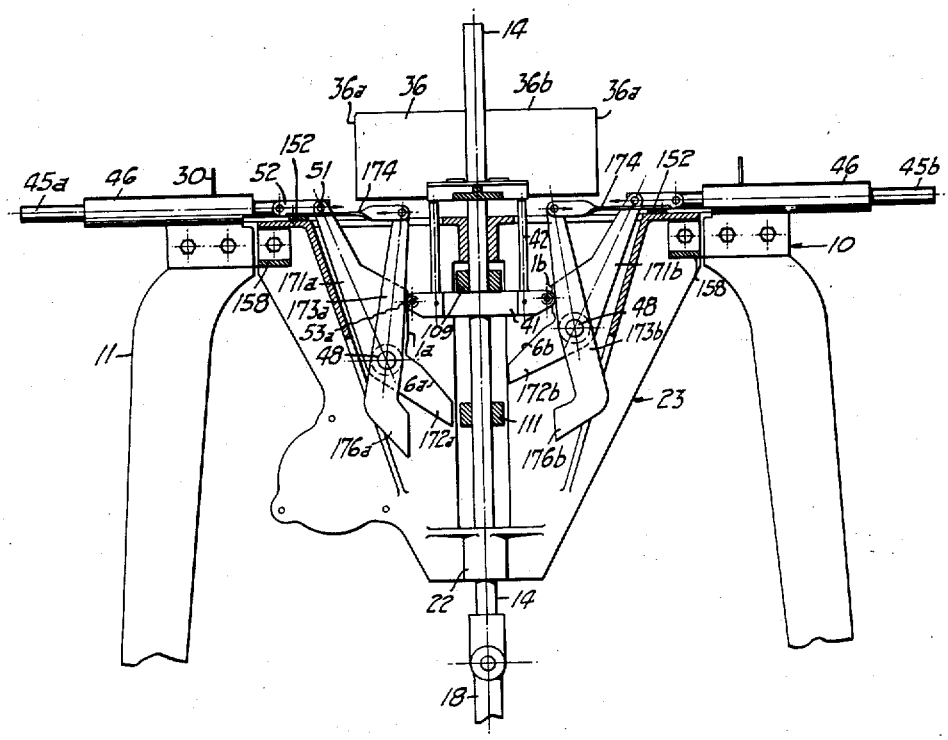
Fig. 16 is a cross sectional detail taken along the line 16—16 of Fig. 14.
Figure 17:
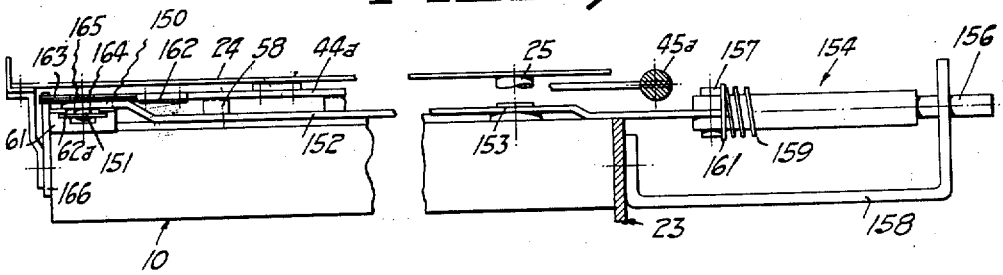
Fig. 17 is a cross sectional detail, showing mechanism employed particularly for the purpose of retracting the end fold line retaining members.

Operation of the modification described above can be briefly outlined as follows: Assuming that a sheet of "Cellophane" or like material 28 has been placed upon the table in properly centered position, and that the operator has depressed the foot lever 21, initial downward movement of the main vertical shaft 14 causes a lowering of the mandrel 36, as previously described. At this time the mandrel 36 lies upon the sheet 28, substantially as illustrated in Fig. 15. Further downward movement of shaft 14 causes the rollers 53a and 53b, carried by the cross-head 41, to engage the lower arm portions 172a and 172b of levers 171a and 171b, to cause these levers to successively rotate in opposite directions, thus moving the folding members 44a and 44b over the mandrel 36. Since at the beginning of this inward movement of the side folding members pin 151 is engaged in the aperture 164 (Fig. 15), the end fold-line retaining members 62a and 62b are likewise moved inwardly over the forward edge portion of the mandrel 36, in unison with the folding members 44a and 44b. Such movement of members 62a and 62b also causes swinging of levers 152, thereby carrying motion through links 174, to swing the cam levers 173a and 173b. Just before the side folding members 44a and 44b have reached the limit of their inward movement, member 163 strikes the cam portion 168 and is thereby released with respect to pin 151. At this time levers 152 will have passed their dead center positions with respect to the toggles established by plungers 156, and therefore, by virtue of the bias afforded by compression springs 159, further movement of levers 152 occurs to project the fold-line retaining members 62a and 62b until their inner ends are substantially in contact. As has been previously explained with respect to Figs. 1 to 13 inclusive, further downward movement of shaft 14 causes the folding and gripping device 73 to be elevated and transposed over the blades 62a and 62b, to generally fold over the projecting bottom margin of the "Cellophane." The shaft 14 is now moved downwardly sufficiently far to bring the cam rollers 53a and 53b into contact with the projecting arms 176a and 176b of the levers 173a and 173b. In this connection, note that at this time arm 176a occupies a position to the right of the position illustrated in Fig. 16, while arm 156b is in a position to the left of that illustrated in this view. Therefore continued downward movement of shaft 14 causes levers 173a and 173b to be rotated back into the positions illustrated in Fig. 16, and during such movement the spring-toggle assemblies 154 are again moved past dead center positions, after which the forward ends of levers 152 are rapidly swung outwardly and members 62a and 62b are rapidly moved to retracted positions. Immediately prior to retraction of members 62a and 62b the folding and gripping device 73 moves down into engagement with these members, whereby retraction of the same permits bar 74 to press the folded end margin directly on the mandrel. The remaining operations of the machine now occur substantially as described with respect to Figs. 1 to 13 inclusive.

I claim:

1. In a machine of the character described for the making of bags from sheet material like "Cellophane," a frame formed to afford a working table, a plate-like mandrel movably secured to the table whereby it may swing vertically with respect to the upper surface of the table, a heater overlying both the upper surface of the table and the mandrel, said heater being hingedly carried by the frame whereby the mandrel is arranged to permit a sheet of said material to be placed between it and the upper surface of the table, means for folding projecting side margins of the sheet over the side edges of the mandrel, means for folding a projecting forward end margin of the sheet over the forward edge of the mandrel, and actuating means serving to effect cyclic operation of said folding means and serving to force said heater downwardly upon the mandrel after a folding operation.

2. In a machine for making paper bags from sheet material like "Cellophane," a frame forming a working table, a plate-like mandrel disposed above the upper surface of the table and movably connected to the frame whereby a sheet of material to form a bag can be placed between the upper surface of the table and the mandrel, means for folding projecting side margins of the sheet over the side edges of the mandrel, means for folding a projecting end margin of the sheet over one end edge of the mandrel, a heater overlying the mandrel and movably connected to the frame, a vertical reciprocal shaft carried by the frame, motive means for effecting cyclic reciprocation of said shaft, and mechanism serving to connect said shaft with both said folding means and said heater, whereby upon reciprocation of said shaft said folding means and said heater are operated in sequence.

3. In a machine for the manufacture of bags from sheet material like "Cellophane," a frame forming a working table, a mandrel overlying the upper surface of the table, means forming a pivotal connection between the rear end of the mandrel and the frame, whereby the mandrel may swing in a vertical plane with respect to the upper surface of the table and whereby a sheet of material to form a bag can be placed between the mandrel and the upper surface of the table, means for folding projecting side margins of the sheet of material over the side edges of the mandrel, means for folding a projecting end margin of the sheet over the forward end edge of the mandrel, a heater overlying both the table and the mandrel, means forming a pivotal mounting for the heater with respect to the frame whereby the heater can be swung downwardly on top of the mandrel, a vertical reciprocal operating shaft carried by the frame, mechanism connecting said shaft with said first-mentioned folding means to effect cyclic operation of the same as the shaft is reciprocated, mechanism connecting said second-mentioned folding means with said shaft to likewise cause cyclic operation of the same as the shaft is reciprocated, mechanism connecting said shaft with said heater to cyclically lower and raise the heater with respect to the table for a pressing and sealing operation, and mechanism connecting the shaft to the mandrel to cause raising and lowering of the mandrel.

4. In a machine for making paper bags, a frame forming a working table, a plate-like mandrel overlying the upper surface of the table and connected to the frame for vertical movement relative thereto, whereby a sheet of paper to be folded can be placed between the mandrel and the upper surface of the table, a heater overlying the table and connected to the frame for vertical movement, and means incorporating toggle linkage for releasably clamping the heater down upon the mandrel.

5. In a machine for making paper bags, a frame forming a working table, a plate-like mandrel overlying the upper surface of the table and connected to the frame for vertical movement relative thereto, whereby a sheet of paper to be folded can be placed between the mandrel and the upper surface of the table, a heater overlying the table and connected to the frame for vertical movement, a reciprocating rod, and means incorporating a toggle linkage for releasably clamping the heater down upon the mandrel upon movement of the rod in one direction and for tripping the toggle linkage to enable raising of the heater when the rod is moved in the opposite direction.

6. In a machine for making paper bags, a frame forming a working table, a plate-like mandrel overlying the upper surface of the table and connected to the frame for vertical movement relative thereto, whereby a sheet of paper to be folded can be placed between the mandrel and the upper surface of the table, a heater overlying the table and connected to the frame for vertical movement, counterbalancing means serving to urge the heater towards an elevated position with respect to the table, a reciprocating member, and means incorporating a toggle linkage for releasably clamping the heater down upon the mandrel upon movement of said member in one direction and for tripping the toggle linkage to enable raising of the heater when said member is moved in an opposite direction.

7. In a machine for making paper bags from sheet material like Cellophane, a frame forming a working table, a plate like mandrel movably mounted with respect to the table whereby a sheet of said material may be placed between said mandrel and the upper surface of the table, means for folding projecting side margins of the sheet over the side edges of the mandrel, means for folding a projecting end margin of the sheet over the forward end edge of the mandrel, retractable fold line retaining means associated with the forward end edge of the mandrel and adapted to be interposed within the last mentioned fold, a sealing heater pivotally carried above the mandrel, a common source of power for operating said folding means, said retractable fold line retaining means, and said heater, and mechanism connecting the source of power with said folding means, the fold line retaining means, and the heater, said mechanism affording a cycle of operation in which the first named folding means is caused to fold the projecting side margins of the sheet over the side edges of the mandrel to afford a longitudinal overlap, the fold line retaining means is moved to establish a line of fold relatively close to the forward end of the mandrel, the end folding means is actuated to fold over the end margin of the sheet over said end edge of the mandrel and the fold line retaining means, the fold line retaining means is actuated to retract the same from the fold, and the heater is then pressed down upon both the longitudinal overlap and the end fold, to form both longitudinal and bottom seals.

8. In a machine as in claim 7 in which the fold line retaining means includes a pair of strips, means actuated from the source of power to move the strips toward each other over the mandrel to provide a line of fold, and means for effecting retraction of the strips away from each other prior to engagement of the sealing heater.

RENE J. GAUBERT.